(12) United States Patent
Song et al.

(10) Patent No.: US 12,238,623 B2
(45) Date of Patent: Feb. 25, 2025

(54) DEVICE AND METHOD FOR SERVICE SUBSCRIPTION VIA E2 INTERFACE IN RADIO ACCESS NETWORK COMMUNICATION SYSTEM

(71) Applicant: Samsung Electronics Co., Ltd., Suwon-si (KR)

(72) Inventors: Junhyuk Song, Suwon-si (KR); Jeongyeob Oak, Suwon-si (KR); Sangkyou Ryou, Suwon-si (KR); Chungkeun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 264 days.

(21) Appl. No.: 17/717,485

(22) Filed: Apr. 11, 2022

(65) Prior Publication Data

US 2022/0240067 A1    Jul. 28, 2022

Related U.S. Application Data

(63) Continuation of application No. PCT/KR2020/013817, filed on Oct. 8, 2020.

(30) Foreign Application Priority Data

Oct. 8, 2020    (KR) .................. 10-2020-0130520

(51) Int. Cl.
*H04W 4/60* (2018.01)
*H04W 4/12* (2009.01)
(Continued)

(52) U.S. Cl.
CPC .............. *H04W 4/60* (2018.02); *H04W 4/12* (2013.01); *H04W 8/183* (2013.01); *H04W 8/24* (2013.01)

(58) Field of Classification Search
CPC ......... H04W 4/12; H04W 4/60; H04W 8/183; H04W 8/24
See application file for complete search history.

(56) References Cited

U.S. PATENT DOCUMENTS

| 8,649,322 B2 | 2/2014 | Grandhi et al. |
| 2011/0201339 A1 | 8/2011 | Kuningas |

(Continued)

FOREIGN PATENT DOCUMENTS

| CN | 109845360 A | 6/2019 |
| CN | 110087229 A | 8/2019 |

(Continued)

OTHER PUBLICATIONS

O-RAN, Working Group 3, Near-Real-time RAN Intelligent Controller, E2 Application Protocol, O-RAN Alliance, O-RAN-WG3.E2AP-v01.01, Jul. 15, 2020 (Year: 2020).*

(Continued)

*Primary Examiner* — Brian P Cox
(74) *Attorney, Agent, or Firm* — Jefferson IP Law, LLP

(57) ABSTRACT

A method performed by an E2 node is provided. The method includes transmitting an E2 setup request message to a radio access network (RAN) intelligent controller (RIC), and receiving an E2 setup response message from the RIC, wherein the E2 setup request message includes an information element (IE) related to an RIC service update request message, and wherein the E2 setup response message includes an IE related to an RIC service update acknowledgement message.

20 Claims, 14 Drawing Sheets

Related U.S. Application Data

(60) Provisional application No. 62/913,857, filed on Oct. 11, 2019.

(51) Int. Cl.
  *H04W 8/18* (2009.01)
  *H04W 8/24* (2009.01)

(56) References Cited

U.S. PATENT DOCUMENTS

| | | |
|---|---|---|
| 2016/0212116 A1 | 7/2016 | Becker et al. |
| 2017/0245180 A1 | 8/2017 | Lim et al. |
| 2018/0063752 A1 | 3/2018 | Hahn et al. |

FOREIGN PATENT DOCUMENTS

| | | |
|---|---|---|
| JP | 2012-507921 A | 3/2012 |
| WO | 2009/062889 A1 | 5/2009 |
| WO | 2019/063107 A1 | 4/2019 |
| WO | 2019/183020 A1 | 9/2019 |

OTHER PUBLICATIONS

O-RAN Working Group 3, Near-Real-time RAN Intelligent Controller, Architecture & E2 General Aspects and Principals, O-RAN Alliance, O-RAN.WG3.E2GAP-v01.01, Jul. 15, 2020 (Year: 2020).*

Nokia, 5G RAN Optimization using the O-RAN software community's RIC (RAN Intelligent Controller); ONS Europe, XP055697834, Sep. 23, 2019.

Extended European Search Report dated Oct. 17, 2022, issued in a counterpart European Application No. 20874009.2-1216.

Indian Office Action dated Jan. 22, 2024, issued in Indian Patent Application No. 202217027065.

Extended European Search Report dated Oct. 16, 2023, issued in European Patent Application No. 23191713.9.

Jana et al.; AT&T; O-RAN SC Release A requirements; Jun. 18, 2019.

O-RAN Alliance; LS on O-RAN Alliance & 3GPP Coordination on O-RAN Alliance Outputs; 3GPP TSG SA Meeting #85 SP-190876; Sep. 5, 2019, Newport Beach, USA.

Abeta et al.; O-RAN Alliance Standardization Trends; Radio Access Network Development Department; Jul. 2019.

Kafka et al.; AT&T; Driving RAN Intelligent Control with Akraino; Apr. 4, 2019, San Jose, California.

O-RAN-WG1.OAM Architecture—v01.00; O-RAN Operations and Maintenance Architecture; Jul. 2019.

O-RAN Alliance; LS on O-RAN Alliance & 3GPP Coordination on O-RAN Alliance Outputs; SA WG2 Meeting #S2-135; S2-1908728; Oct. 14-18, 2019; Split Croatia.

Chinese Notice of Allowance with English translation dated Jun. 3, 2024; Chinese Appln. No. 202080085955.5.

Japanese Notice of Allowance with English translation dated Sep. 30, 2024; Japanese Appln. No. 2022-521709.

* cited by examiner

| IE/Group Name | Presence | Range | IE type and reference | Semantics description | Criticality | Assigned Criticality |
|---|---|---|---|---|---|---|
| Message Type | M | | x.x.x.x | | YES | reject |
| RIC REQUEST ID | M | | x.x.x.x | | YES | reject |
| E2 NODE FUNTION ID | M | | x.x.x.x | | YES | reject |
| SERVICES TO ADD | | 0..<maxofE2functionID> | | | YES | reject |
| >E2 NODE FUNCTION ID | M | | x.x.x.x | | YES | reject |
| >E2 NODE FUNCTION NAME | M | | x.x.x.x | | YES | reject |
| SERVICES TO DELETE | | 0..<maxofE2functionID> | | | YES | reject |
| >E2 NODE FUNCTION ID | M | | x.x.x.x | | YES | reject |
| >E2 NODE FUNCTION NAME | M | | x.x.x.x | | YES | reject |

FIG.8A

| IE/Group Name | Presence | Range | IE type and reference | Semantics description | Criticality | Assigned Criticality |
|---|---|---|---|---|---|---|
| Message Type | M | | X.X.X.X | | YES | reject |
| RIC REQUEST ID | M | | X.X.X.X | | YES | reject |
| E2 NODE FUNTION ID | M | | X.X.X.X | | YES | reject |
| E2 SUBSCRIPTION TYPE | M | | X.X.X.X | | YES | reject |

FIG.8B

| IE/Group Name | Presence | Range | IE type and reference | Semantics description |
|---|---|---|---|---|
| Procedure Code | M | | INTEGER (0..255) | |
| Type of Message | M | | CHOICE(Initiating, Successful, Unsuccesful, ...) | |

FIG.9

| IE/Group Name | Presence | Range | IE type and reference | Semantics description |
|---|---|---|---|---|
| RIC REQUEST ID | M | | INTEGER (0..65535) | |

FIG.10

| IE/Group Name | Presence | Range | IE type and reference | Semantics description |
|---|---|---|---|---|
| E2 NODE FUNTION ID | M | | INTEGER (0..4095) | |

FIG.11

DEVICE AND METHOD FOR SERVICE SUBSCRIPTION VIA E2 INTERFACE IN RADIO ACCESS NETWORK COMMUNICATION SYSTEM

CROSS-REFERENCE TO RELATED APPLICATION(S)

This application is a continuation application, claiming priority under § 365(c), of an International application No. PCT/KR2020/013817, filed on Oct. 8, 2020, which is based on and claims the benefit of a U.S. Provisional application Ser. No. 62/913,857, filed on Oct. 11, 2019, in the U.S. Patent and Trademark Office, and of Korean patent application number 10-2020-0130520, filed on Oct. 8, 2020, in the Korean Intellectual Property Office, the disclosure of each of which is incorporated by reference herein in its entirety.

BACKGROUND

1. Field

The disclosure relates to a radio access network communication system. More particularly, the disclosure relates to an apparatus and a method for transmitting a message when an E2 setup for an open radio access network (O-RAN) base station, which uses an E2 message of a wireless communication system, occurs.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post long term evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In order to meet the demand for wireless data traffic, a 5G system, new radio or next radio (NR) are commercialized, and it is expected that a service of a high data transmission rate is provided to users through a 5G system like 4G, and wireless communication services having various purposes, such as Internet of Things (IoT) and a service requiring high reliability for a specific purpose, are provided. The open radio access network (O-RAN), which was established by operators and equipment providers in a system mixed with a 4G communication system and a 5G system, defines new network element (NE) and interface standards based on existing 3rd generation partnership project (3GPP), and suggests an O-RAN structure.

The above information is presented as background information only to assist with an understanding of the disclosure. No determination has been made, and no assertion is made, as to whether any of the above might be applicable as prior art with regard to the disclosure.

SUMMARY

As $4^{th}$ generation/$5^{th}$ generation communication systems (hereinafter, referred to as 4G/5G systems or new radio or next radio (NR)) are currently commercialized, there is a demand for support of a differentiated service for a user in a virtualized network. The O-RAN newly defined existing $3^{rd}$ generation partnership project (3GPP) network element (NE), radio unit (RU), distributed unit (DU), central unit-control plane (CU-CP), central unit-user plane (CU-UP) as O-RU, O-DU, O-CU-CP, O-CU-UP, respectively, and additionally standardized a near-real-time RAN intelligent controller (RIC). The disclosure relates to an E2 subscription message for the newly defined RIC to request a service from the O-DU, O-CU-CP or O-CU-UP. In addition, the disclosure relates to a method for segmenting the E2 subscription message on a UE basis, a group basis, a cell basis, a network slice basis, and processing the same. Herein, the O-RU, O-DU, O-CU-CP, O-CU-UP may be understood as entities constituting the RAN, which operate according to O-RAN standards, and may be referred to as an E2 node.

The E2 node(s) transmits an E2 SETUP REQUEST message to the RIC to initialize a service, and the RIC transmits an E2 SETUP RESPONSE message in response thereto. In the next procedure, the E2 node transmits a call processing function of a radio access network (RAN) that the E2 node supports to the RIC in the form of a service update message, and the RIC transmits a service update acknowledgement message in response thereto. Thereafter, the RIC generates an E2 subscription request message, and transmits the same to the E2 node (for example, the O-CU-CP, O-CU-UP, O-DU), thereby setting up a call processing event. After setting up the event, the E2 node transmits a subscription request response message to the RIC. In this case, six messages at most should be transmitted from E2 SETUP to the subscription completion step at which a service start is possible. The disclosure relates to supplementing of an E2 SETUP message between a newly defined RIC and an E2 node (for example, an O-DU, an O-CU-CP, an O-CU-UP), so that a service update step, a subscription step are completed at an E2 SETUP step.

Aspects of the disclosure are to address at least the above-mentioned problems and/or disadvantages and to provide at least the advantages described below. Accordingly, an aspect of the disclosure is to provide a method of a first node in a wireless communication system. The method includes at a step of generating, by an E2 node, an E2 SETUP REQUEST message, a step of including an RIC SERVICE UPDATE Information Element (IE), at a step of generating, by an RIC, an E2 SETUP RESPONSE message, a step of including an RIC SERVICE UPDATE ACKNOWLEDGE Information Element (IE), and a step of including, by the RIC, an RIC SUBSCRIPTION Information Element (IE) in the E2 SETUP RESPONSE message, and a step of transmitting, by the E2 node, an E2 SUBSCRIPTION RESPONSE message to the RIC. In addition, an RIC SERVICE UPDATE message, an RIC SUBSCRIPTION REQUEST message which are optimized for message transmission may be identified based on the E2 SETUP REQUEST message transmitted from the E2 node, detailed information elements of the E2 SETUP RESPONSE message transmitted from the RIC, respectively, and in the case of the RIC SERVICE UPDATE message, information of the information element may include MESSAGE TYPE identifier information, RIC REQUEST ID identifier information, E2 NODE FUNCTION ID identifier information, SERVICES TO ADD list, SERVICES TO DELETE list identifier information, which are set based on the call processing function of the E2 node. In the case of the RIC SUBSCRIPTION REQUEST, information of the information element may include MESSAGE TYPE identifier information, RIC REQUEST ID identifier information, E2 NODE FUNCTION ID identifier information, RIC SUBSCRIPTION TYPE identifier information, which are set based on the call processing function of the E2 node.

Additional aspects will be set forth in part in the description which follows and, in part, will be apparent from the description, or may be learned by practice of the presented embodiments.

In accordance with an aspect of the disclosure, a method performed by an E2 node is provided. The method includes transmitting an E2 setup request message to a radio access network (RAN) intelligent controller (RIC), and receiving an E2 setup response message from the RIC, in which the E2 setup request message includes an information element (IE) related to a service update request message of the RIC, and the E2 setup response message includes an IE related to a service update acknowledge message of the RIC.

In accordance with another aspect of the disclosure, a method performed by an RIC is provided. The method includes receiving an E2 setup request message from an E2 node, and transmitting an E2 setup response message to the E2 node, in which the E2 setup request message includes an information element (IE) related to a service update request message of the RIC, and the E2 setup response message includes an IE related to a service update acknowledge message of the RIC.

In accordance with another aspect of the disclosure, an apparatus functioning as an E2 node is provided. The apparatus includes at least one transceiver, and at least one processor coupled with the at least one transceiver, and the at least one processor is configured to transmit an E2 setup request message to a radio access network (RAN) intelligent controller (RIC), and to receive an E2 setup response message from the RIC, in which the E2 setup request message includes an information element (IE) related to a service update request message of the RIC, and the E2 setup response message includes an IE related to a service update acknowledge message of the RIC.

In accordance with another aspect of the disclosure, an apparatus functioning as an RIC is provided. The apparatus includes at least one transceiver, and at least one processor coupled with the at least one transceiver, and the at least one processor is configured to receive an E2 setup request message from an E2 node, and to transmit an E2 setup response message to the E2 node, in which the E2 setup request message includes an information element (IE) related to a service update request message of the RIC, and the E2 setup response message includes an IE related to a service update acknowledge message of the RIC.

The apparatus and the method according to various embodiments of the disclosure provide an efficient procedure between a near real time (RT) RAN intelligent controller (RIC) and an E2 node, by using information elements (IEs), which are used in a service update procedure between the E2 node and the RIC, in an E2 setup procedure.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 8A, 8B, 9, 10, and 11 are views illustrating examples of information elements (IE) of E2 RIC service update according to various embodiments of the disclosure.

Throughout the drawings, like reference numerals will be understood to refer to like parts, components, and structures.

DETAILED DESCRIPTION

Figure 1:
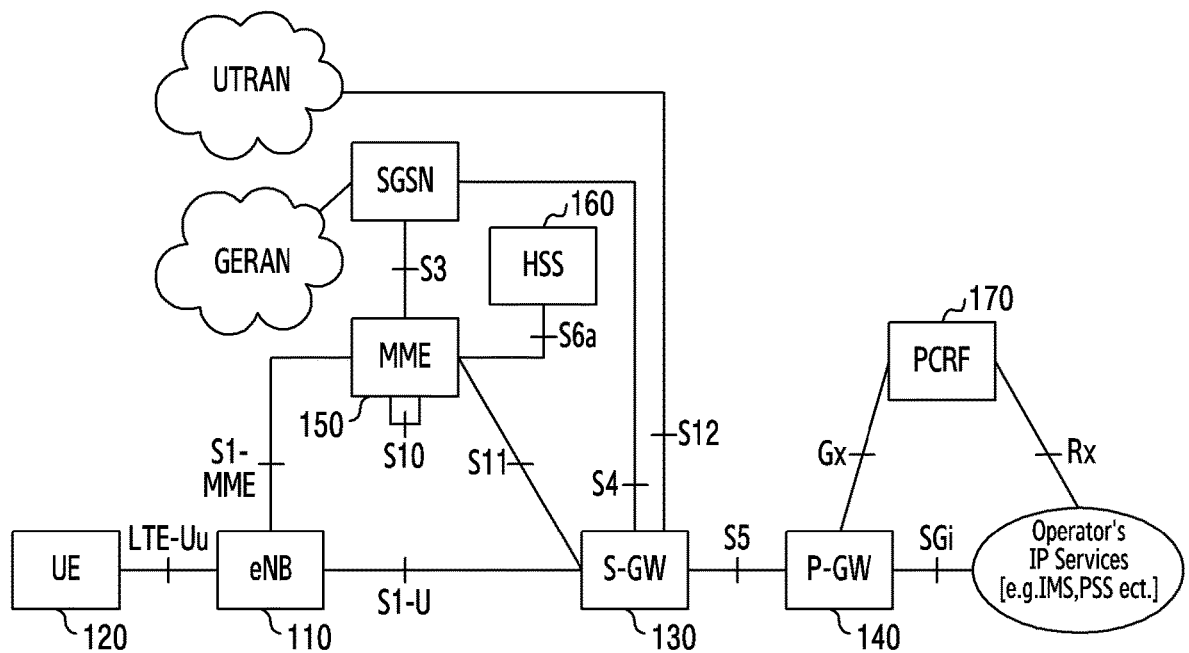
FIG. 1 is a view illustrating an example of a 4th generation (4G) long term evolution (LTE) core system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

All of the terms used herein, which include technical or scientific terms, may have the same meaning that is generally understood by a person skilled in the art. It will be further understood that terms, which are defined in a dictionary, may be interpreted as having the same or similar meanings as or to contextual meanings of the relevant related art and not in an idealized or overly formal way, unless expressly so defined herein in the disclosure. In some cases, even if the terms are terms which are defined in the specification, they should not be interpreted as excluding embodiments of the disclosure.

In various embodiments of the disclosure described below, hardware-wise approach methods will be described by way of an example. However, various embodiments of the disclosure include technology using both hardware and software, and thus do not exclude software-based approach methods.

The disclosure described hereinbelow relates to an apparatus and a method for performing a subscription procedure between a device in a radio access network (RAN) and a device controlling the RAN in a wireless communication system.

As used herein, terms indicating signals, terms indicating channels, terms indicating control information, terms indicating network entities, terms indicating components of a device are merely examples for convenience of explanation. Accordingly, the disclosure is not limited to the terms described below, and other terms having the same technical meanings may be used.

In addition, the disclosure describes various embodiments by using terms used in some communication standards (for example, 3$^{rd}$ generation partnership project (3GPP)), but these embodiments are merely examples. Various embodiments of the disclosure may be easily modified and applied to other communication systems.

In the disclosure described below, an uplink refers to a radio link through which a terminal (user equipment (UE) or a mobile station (MS)) transmits data or control signals to a base station (eNode B or a base station (BS)), and a downlink refers to a wireless link through which a base station transmits data or control signals to a terminal. In addition, the base station is an entity that performs resource allocation of a terminal, and may be at least one of an eNode B, a Node B, a base station (BS), a next generation Node B (gNB), a radio access unit, a base station controller, or a node on a network. The terminal may include user equipment (UE), a mobile station (MS), a cellular phone, a smartphone, a computer, or a multimedia system capable of performing a communication function.

5$^{th}$ generation communication systems (hereinafter, interchangeably used with 5G systems, new radio or next radio (NR) systems) are commercialized in order to meet the demand for wireless data traffic, and it is expected that a service of a high data transmission rate is provided to users through a 5G system like 4G, and also, wireless communication services having various purposes, such as IoT and a service requiring high reliability for a specific purpose, are provided.

The open radio access network (O-RAN) which was established by operators and equipment providers in systems mixed with a 4G communication and a 5G communication system defines new network element (NE) and interface standards based on existing 3GPP standards, and thereby suggests an O-RAN structure. The O-RAN newly defines existing 3GPP NE, radio unit (RU), distributed unit (DU), central unit (CU)-control plane (CP), CU-user plane (UP) as O-RU, O-DU, O-CU-CP, O-CU-CP, respectively, and additionally, the O-RAN standardizes a near-real-time RAN intelligent controller (RIC) and a non-real-time (NRT) RIC. For example, the RIC may be a server which is centrally disposed in one physical place. In addition, the RIC is a logical node that collects information on a cell site that a terminal and an O-DU, an O-CU-CP or an O-CU-UP transmit and receive. The O-DU and the RIC, the O-CU-CP and the RIC, and the O-CU-UP and the RIC may be connected through Ethernet. To achieve this, interfaces standards are required for communication between the O-DU and the RIC, between the O-CU-CP and the RIC, between the O-CU-UP and the RIC, and message standards of E2-DU, E2-CU-CP, E2-CU-UP, etc. and definition of procedures between the O-DU, O-CU-CP, O-CU-UP and the RIC are required. In particular, support of a differentiated service for a user in a virtualized network is required, and call processing messages/functions generated in the O-RAN are concentrated on the RIC, so that definition of functions of messages of the E2-DU, E2-CU-CP, E2-CU-CP for supporting a service for a wide cell coverage is required.

Specifically, the RIC may set an event occurrence condition by generating and transmitting an E2 subscription message to the O-DU, O-CU-CP, or O-CU-UP. The O-DU, O-CU-CP or O-CU-UP may determine that the set condition is satisfied, and may carry a 3GPP call processing message conforming to the satisfied condition in a container, may classify the message according to a user identifier, a cell identifier, a network slice identifier, and then, may transmit the message to the RIC through an E2 indication/report.

The RIC may identify that the call processing message information collected in the O-RAN based on the user identifier is related to a specific user/specific cell/specific network slice according to each I/F. The collected information may be information that is transmitted from at least one of the (O-)CU-CP, (O-)CU-UP and (O-) DU. The RIC may identify that information collected from different entities is related to one specific user/specific cell/specific network slice, based on the user identifier, and may provide a service specialized to the specific user/specific cell/specific network slice to a plurality of cells/network slices based on the collected information, and may also determine a key performance indicator (KPI) of a service provided to each user.

Since a normal call processing service is limited to a base station basis, there is a limit to the number of supportable cells. In addition, since collected information is limited to a specific base station, it is difficult to efficiently monitor whole radio resources. According to various embodiments of the disclosure, the RIC may efficiently provide resource optimization and a user-specialized service or a user-required service for a specific user/specific cell/specific network for cells of a wide range, by collecting call processing messages (for example, E1, F1, X2, XN, RRC, etc.) of respective IFs, generated by the O-RU, O-DU, O-CU-CP, or O-CU-UP. For example, the RIC may set an additional carrier in order for a specific terminal to receive a service through carrier aggregation to efficiently divide a network slice or to optimize resources, or may set an additional cell to perform dual connection in order for a specific terminal to receive service through dual connectivity (DC). In addition, the RIC may set, such that a specific terminal avoids connection with a specific cell during inter-cell movement, and connects to a specific cell. In addition, the RIC may efficiently perform resource optimization through machine learning though analysis based on collected information. In addition, resource optimization of the disclosure is not limited to the above-described explanation. In addition, according to the disclosure, it is possible not only to collect information according to a terminal but also to collect information according to a bearer.

Information collected for a specific user may be used in a collection server or an RIC (near RIC) or NRT-RIC, but may be provided to an operations support system (OSS) and/or a business support system (BSS), so that the information is used to provide a specialized service to a user.

FIG. 1 illustrates an example of a $4^{th}$ generation (4G) long term evolution (LTE) core system according to an embodiment of the disclosure.

Referring to FIG. 1, the LTE core system includes a base station 110, a terminal 120, a serving gateway (S-GW) 130, a packet data network gateway (P-GW) 140, a mobility management entity (MME) 150, a home subscriber server (HSS) 160, a policy and charging rule function (PCRF) 170.

The base station 110 is a network infrastructure that provides radio access to the terminal 120. For example, the base station 110 is a device that performs scheduling by collecting state information, such as a buffer state, available transport power, a channel state, etc. of the terminal 120. The base station 110 has a coverage that is defined as a predetermined geographical region based on a distance by which a signal is transmitted. The base station 110 is connected with the MME 150 through an S1-MME interface. The base station 110 may be referred to as 'access point (AP),' 'eNodeB (eNB),''wireless point,' 'transmission/reception point (TRP),' or other terms having the same technical meaning as the above-mentioned terms, in addition to the base station.

The terminal 120 is a device that is used by a user and performs communication with the base station 110 through a wireless channel According to circumstances, the terminal 120 may be operated without user's intervention. That is, at least one of the terminal 120 may be a device that performs machine type communication (MTC), and may not be carried by a user. The terminal 120 may be referred to as 'user equipment (UE),' 'mobile station,' 'subscriber station,' 'customer-premises equipment (CPE),' 'remote terminal,' 'wireless terminal,' or 'user device,' or other terms having the same technical meaning as the above-mentioned terms, in addition to the terminal.

The S-GW 130 provides a data bearer and generates or controls a data bearer under control of the MME 150. For example, the S-GW 130 process a packet arriving from the base station 110 or a packet to forward to the base station 110. In addition, the S-GW 130 may perform an anchoring role during a handover between base stations of the terminal 120. The P-GW 140 may function as a connection point with an external network (for example, an Internet network). In addition, the P-GW 140 may allocate an Internet protocol (IP) address to the terminal 120, and may perform an anchoring role for the S-GW 130. In addition, the P-GW 140 may apply a quality of service (QoS) policy of the terminal 120, and may manage account data.

The MME 150 manages mobility of the terminal 120. In addition, the MME 150 may perform authentication, bearer management, etc. with respect to the terminal 120. That is, the MME 150 is in charge of mobility management for the terminal and various control functions. The MME 150 may interwork with a serving general packet radio service (GPRS) support node (SGSN).

The HSS 160 stores key information and a subscriber profile for authenticating the terminal 120. The key information and the subscriber profile may be transmitted from the HSS 160 to the MME 150 when the terminal 120 connects to a network.

The PCRF 170 defines rules regarding a policy and charging. Stored information may be transmitted to the P-GW 140 from the PCRF 170, and the P-GW 140 may perform control (for example, QoS management, charging, etc.) with respect to the terminal 120, based on the information provided from the PCRF 170.

Carrier aggregation (CA) technology refers to technology for increasing a frequency use efficiency from the viewpoint of a terminal or a base station, by combining a plurality of component carriers and letting one terminal transmit and receive signals by using the plurality of component carriers simultaneously. Specifically, according to the CA technology, the terminal and the base station may exchange signals using a broadband by using the plurality of component carriers in an uplink (UL) and a downlink (DL), and in this case, the respective component carriers may be positioned in different frequency bands. Hereinafter, the uplink refers to a communication link though which a terminal transmits a signal to a base station, and the downlink refers to a communication link through which a base station transmits a signal to a terminal. In this case, the number of uplink component carriers and the number of downlink component carriers may be different from each other.

Dual connectivity or multi connectivity refers to technology that increases a frequency use efficiency from the viewpoint of a terminal or a base station, by connecting one terminal to a plurality of different base stations and allowing the terminal to transmit and receive signals by using carriers in the plurality of base stations positioned in different frequency bands simultaneously. The terminal may be connected to a first base station (for example, a base station providing a service by using LTE or 4G mobile communication technology) and a second base station (for example, a base station providing a service by using NR or 5G mobile communication technology), simultaneously, and may transmit and receive traffic. In this case, frequency resources that the respective base stations use may be positioned in different bands. An operating method based on double connectivity of LTE and NR described above may be referred to as 5G non-standalone (NSA).

Figure 2A:
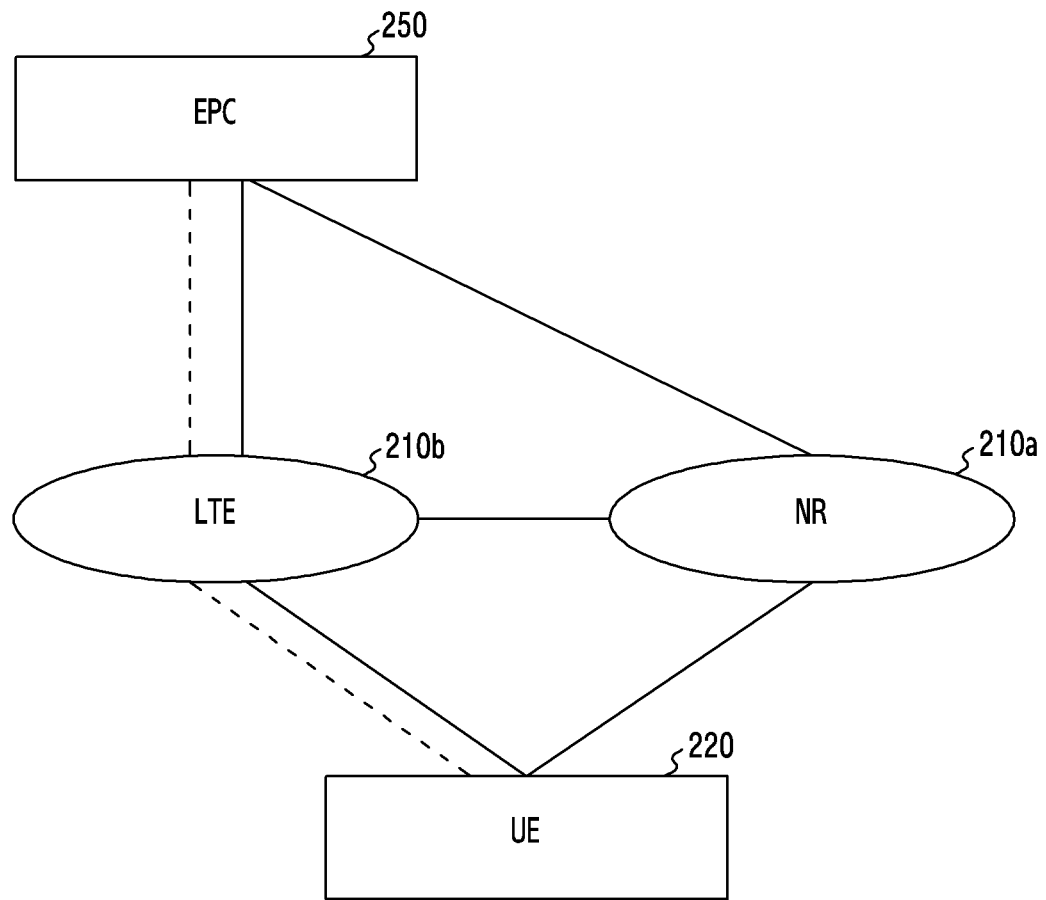
FIG. 2A is a view illustrating an example of a 5th generation (5G) non-standard alone (NSA) system according to an embodiment of the disclosure.

FIG. 2A illustrates an example of a 5G NSA system according to an embodiment of the disclosure.

Referring to FIG. 2A, the 5G NSA system includes an NR RAN 210a, an LTE RAN 210b, a terminal 220, an evolved packet core (EPC) 250. The NR RAN 210a, the LTE RAN 210b may be connected to the EPC 250, and the terminal 220 may receive services from any one or both of the NR-RAN 210a, the LTE RAN 210B, simultaneously. The NR RAN 210a includes at least one NR base station, and the LTE RAN 210b includes at least one LTE base station. Herein, the NR base station may be referred to as '$5^{th}$ generation node (5G node),' 'next generation nodeB (gNB),' or other terms having the same technical meaning as the above-mentioned terms. In addition, the NR base station may have a structure that is divided into a central unit (CU) and a digital unit (DU), and the CU may have a structure that is divided into a CU-control plane (CP) unit and a CU-user plane (UP) unit.

In the structure shown in FIG. 2A, the terminal 220 may perform radio resource control (RRC) connection through a first base station (for example, a base station belonging to the LTE RAN 210b), and may receive a service of a function provided on the control plane (for example, connectivity management, mobility management, etc.). In addition, the terminal 220 may receive additional radio resources for transmitting and receiving data through a second base station (for example, a base station belonging to the NR RAN 210a). The dual connectivity technology using LTE and NR may be referred to as evolved universal terrestrial radio access (E-UTRA)-NR dual connectivity (EN-DC). Similarly, dual connectivity technology in which the first base station uses NR technology and the second base station uses LTE technology is referred to as NR-E-UTRA dual connectivity (NE-DC). In addition, various embodiments may be applied to multi connectivity of various forms and carrier aggregation technology. In addition, various embodiments may be applied when a first system using a first communication technique and a second system using a second communication technique are implemented in one device, or when a first base station and a second base station are positioned on the same geographical position.

Figure 2B:
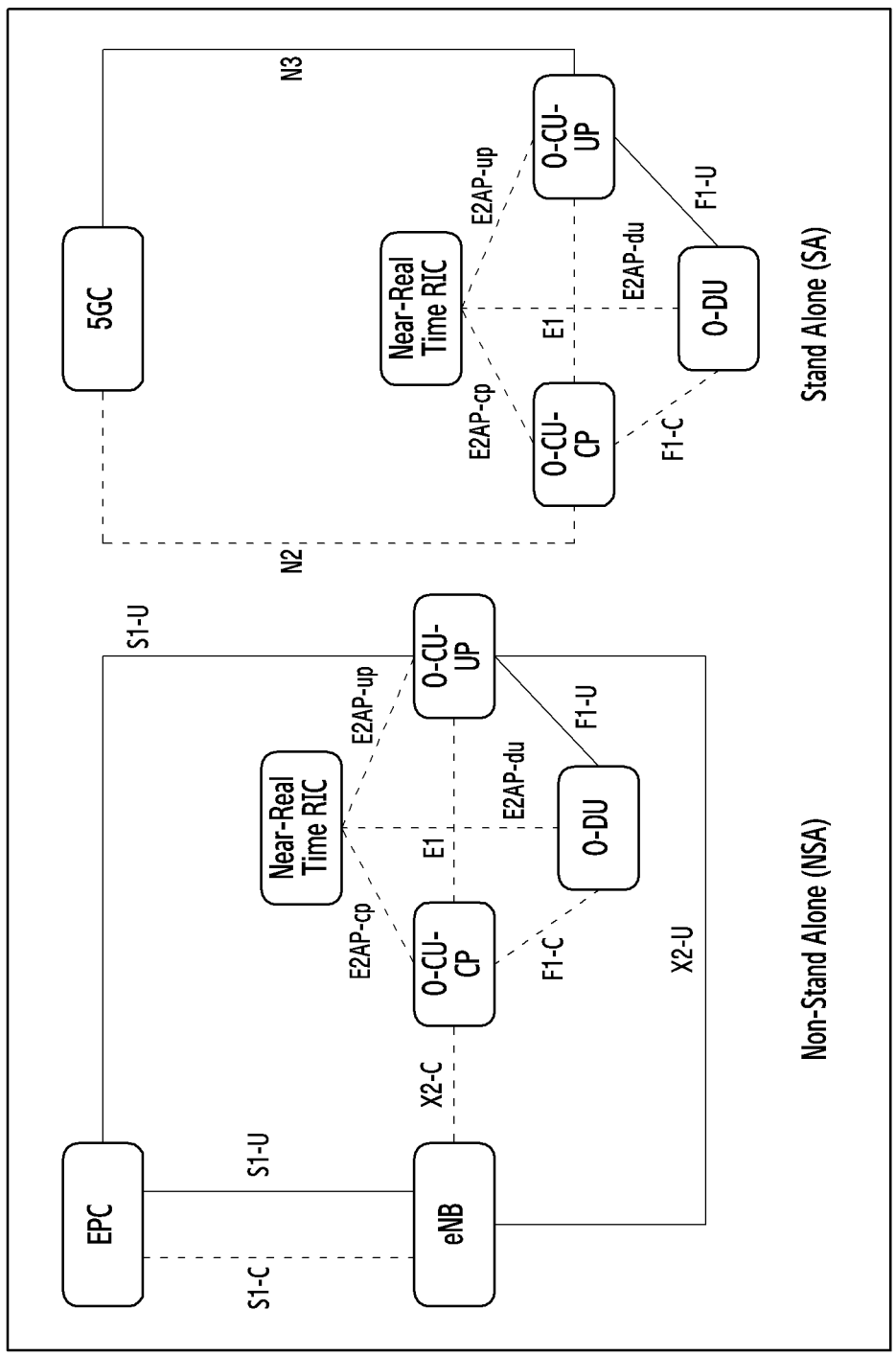
FIG. 2B is a view illustrating an example of an architecture for an O-RAN according to an embodiment of the disclosure.

FIG. 2B illustrates an example of an architecture for an O-RAN according to an embodiment of the disclosure.

For the purpose of E2-SM-key performance indicator (KPI) monitoring (KPIMON) of an E2 service model, an O-RAN non-stand alone mode within a multi-connectivity operation using E-UTRA and NR radio access technology may be considered, and it may be assumed that an E2 node is in an O-RAN stand alone mode.

Referring to FIG. 2B, in deployment of the O-RAN non-stand alone mode, an eNB is connected with an EPC through an S1-C/S1-U interface, and is connected with an O-CU-CP through an X2 interface. An O-CU-CP for deployment of the O-RAN stand alone mode may be connected with a 5G core (5GC) through an N2/N3 interface.

Figure 3:
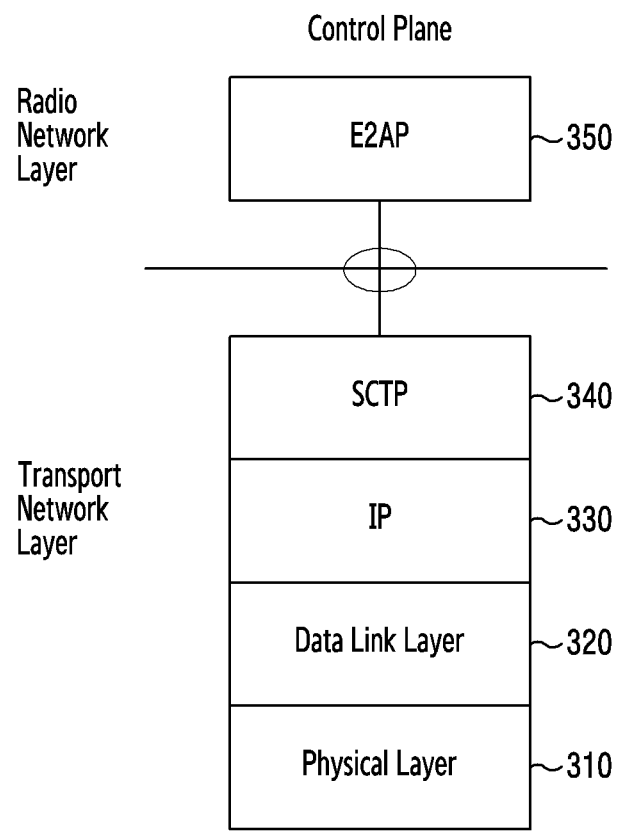
FIG. 3 is a view illustrating a protocol stack of an E2 application protocol message on a radio access network according to an embodiment of the disclosure.

FIG. 3 illustrates a protocol stack of an E2 application protocol message on a radio access network according to an embodiment of the disclosure.

Referring to FIG. 3, a control plane includes a transport network layer and a radio network layer. The transport network layer includes a physical layer 310, a data link layer 320, an Internet protocol (IP) 330, and a stream control transmission protocol (SCTP) 340.

The radio network layer includes an E2AP 350. The E2AP 350 is used to transmit a subscription message, an indication message, a control message, a service update message, a service query message, and is transmitted on a higher layer of the SCTP 340 and the IP 330.

Figure 4:
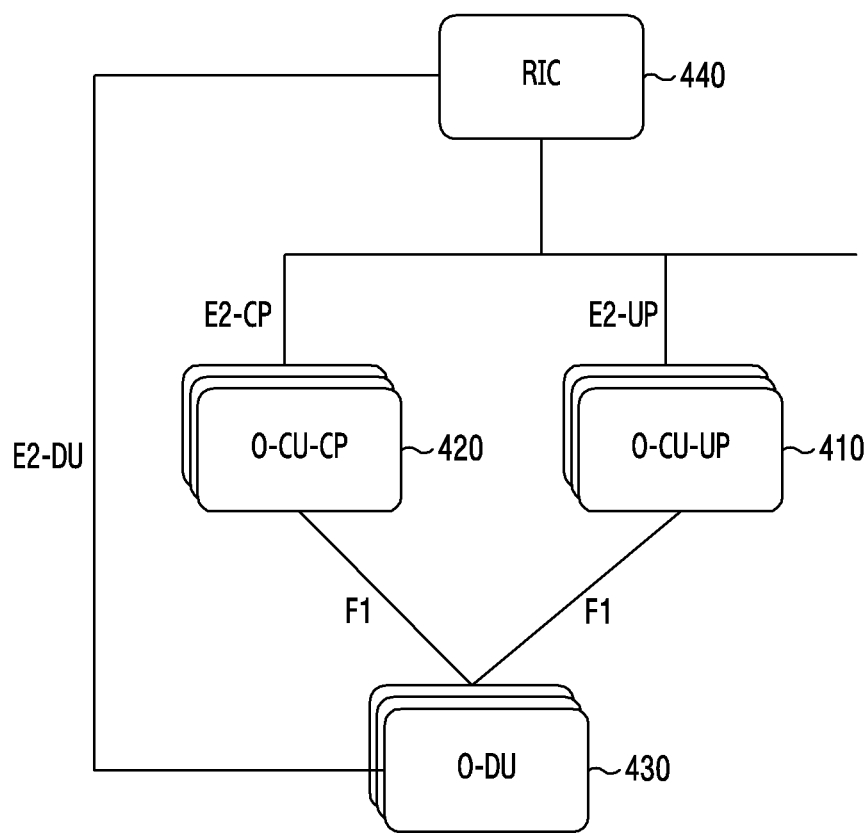
FIG. 4 is a view illustrating an example of a connection between a base station and a radio access network intelligence controller (RIC) on a radio access network according to an embodiment of the disclosure.

FIG. 4 illustrates an example of connection between a base station and a radio access network intelligence controller (RIC) on a radio access network according to an embodiment of the disclosure.

Referring to FIG. 4, the RIC 440 is connected with an O-CU-CP 420, an O-CU-UP 410, and an O-DU 430. The RIC 440 is in charge of a function for controlling an RAN node (or a device performing an RAN function, and for example, the O-CU-CP 420, the O-CU-UP 410, the O-DU 430). The RIC 440 may be defined as a device for customizing RAN functionality for a new service or regional resource optimization. The RIC 440 may provide functions such as network intelligence (for example, policy enforcement, handover optimization), resource assurance (for example, radio-link management, advanced self-organized network (SON)), resource control (for example, load balancing, slicing policy), etc. The RIC 440 may perform communication with the O-CU-CP 420, the O-CU-UP 410, the O-DU 430. The RIC 440 may be connected with the respective nodes through E2-CP, E2-UP, E2-DU interfaces. In addition, an interface between the O-CU-CP and the DU, between the O-CU-UP and the DU may be referred to as an F1 interface. In the following description, the DU and the O-DU, the CU-CP and the O-CU-CP, the CU-UP and the O-CU-UP may be interchangeably used.

FIG. 4 illustrates one RIC 440, but according to various embodiments, there may exist a plurality of RICs. The plurality of RICs may be implemented by a plurality of pieces of hardware positioned on the same physical position, or may be implemented through virtualization using one piece of hardware.

Figure 5:
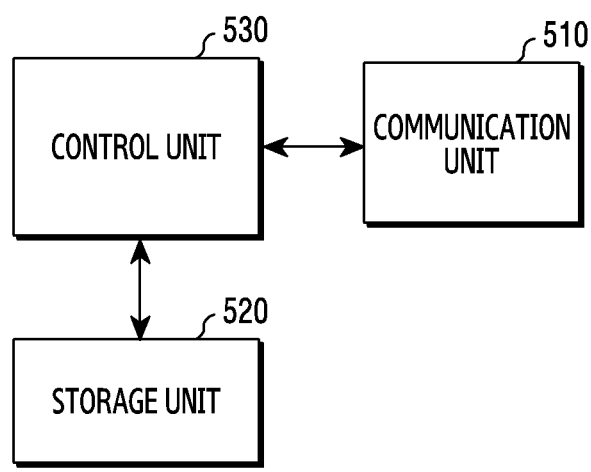
FIG. 5 is a view illustrating a configuration of a device on a radio access network according to an embodiment of the disclosure.

FIG. 5 illustrates a configuration of a device according to an embodiment of the disclosure.

The structure illustrated in FIG. 5 may be understood as a configuration of a device having a function of at least one of an RIC, an O-CU-CP, an O-CU-UP, and an O-DU. The term "unit" or terms ending with suffixes "-er," and "-or" used in the following description refer to a unit processing at least one function or operation, and may be implemented by hardware, software, or a combination of hardware and software.

Referring to FIG. 5, a core network device is configured by including a communication unit 510, a storage 520, a controller 530.

The communication unit 510 provides an interface for performing communication with other devices in a network. That is, the communication unit 510 converts a bit stream transmitted from the core network device to another device into a physical signal, and converts a physical signal received from another device to a bit stream. That is, the communication unit 510 may transmit and receive signals. Accordingly, the communication unit 510 may be referred to as a modem, a transmitter, a receiver, or a transceiver. In this case, the communication unit 510 enables the core network device to communicate with other devices or systems through backhaul connection (for example, wired backhaul or wireless backhaul) or a network.

The storage 520 may store data such as a basic program for operations of the core network device, an application, configuration information, or the like. The storage 520 may be configured by a volatile memory, a nonvolatile memory, or a combination of a volatile memory and a nonvolatile memory. In addition, the storage 520 provides stored data according to a request of the controller 530.

The controller 530 controls overall operations of the core network device. For example, the controller 530 may transmit and receive signals through the communication unit 510. In addition, the controller 530 may write and read out data on or from the storage 520. To achieve this, the controller 530 may include at least one processor. According to various embodiments, the controller 530 may control the device to perform operations according to various embodiments described in the disclosure.

Figure 6:
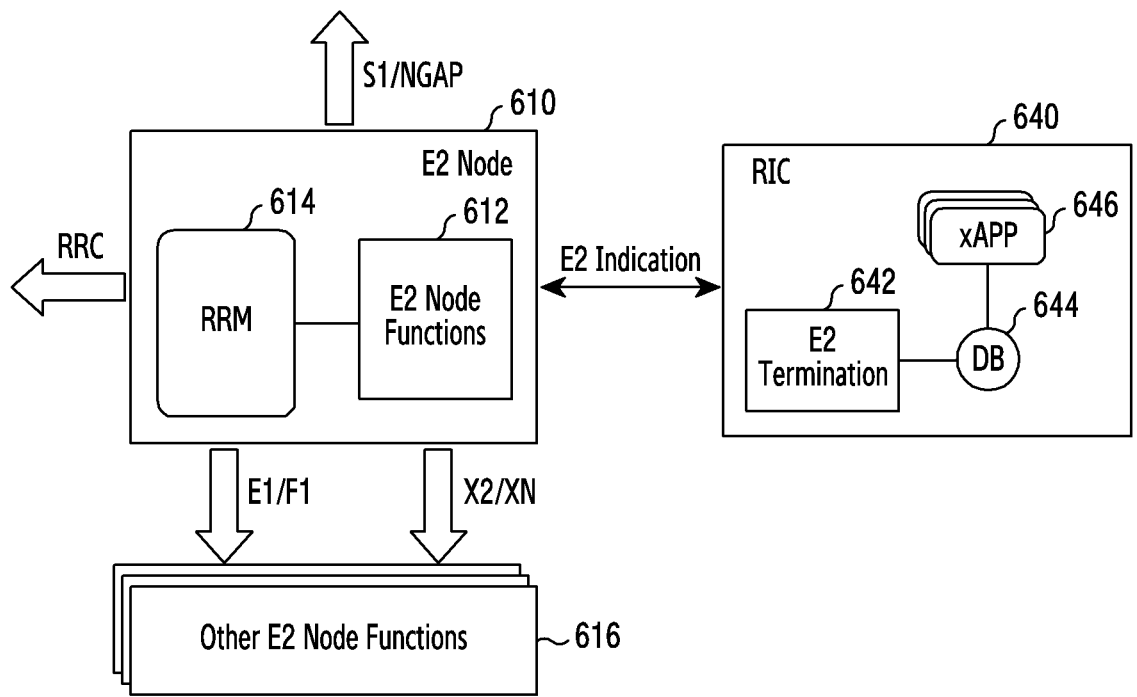
FIG. 6 is a view illustrating logical functions of an E2 node and an RIC related to an E2 message on a radio access network according to an embodiment of the disclosure.

FIG. 6 illustrates logical functions of an E2 node and an RIC related to an E2 message on a radio access network according to an embodiment of the disclosure.

Referring to FIG. 6, the RIC 640 and the E2 node 610 may transmit or receive an E2 message to or from each other. For example, the E2 node 610 may be an O-CU-CP, an O-CU- UP, an O-DU, or a base station. A communication interface of the E2 node may be determined according to type of the E2 node 610. For example, the E2 node 610 may perform communication with another E2 node 616 through an E1 interface or an F1 interface. Alternatively, for example, the E2 node 610 may perform communication with the E2 node 616 through an X2 interface or an XN interface. Alternatively, for example, the E2 node 610 may perform communication through an S1 interface or a next generation application protocol (NGAP) interface (that is, an interface between a next generation (NG) RAN node and an access and mobility management function (AMF)).

The E2 node 610 may include an E2 node function 612. The E2 node function 612 is a function corresponding to a specific xApp (application S/W) 646 installed in the RIC 640. For example, in the case of KPI monitoring, KPI monitoring collection S/W is installed in the RIC 640, and the E2 node 610 may include the E2 node function 612 which generates KPI parameters and then transmits an E2 message including the KPI parameters to an E2 termination 642 positioned in the RIC 640. The E2 node 610 may include a radio resource management (RRM) 614. The E2 node 610 may manage resources provided to the radio network for a terminal.

The E2 termination 642 positioned in the RIC 640 is a termination of the RIC 640 for the E2 message, and performs a function of interpreting the E2 message transmitted by the E2 node 610 and then transmitting the same to the xApp 646. A database (DB) 644 positioned in the RIC 640 may be used for the E2 termination 624 or the xApp 646. The E2 node 610 illustrated in FIG. 6 is a termination of at least one interface, and may be understood as a termination of messages transmitted to a terminal, a neighboring base station, a core network.

Figure 7A:
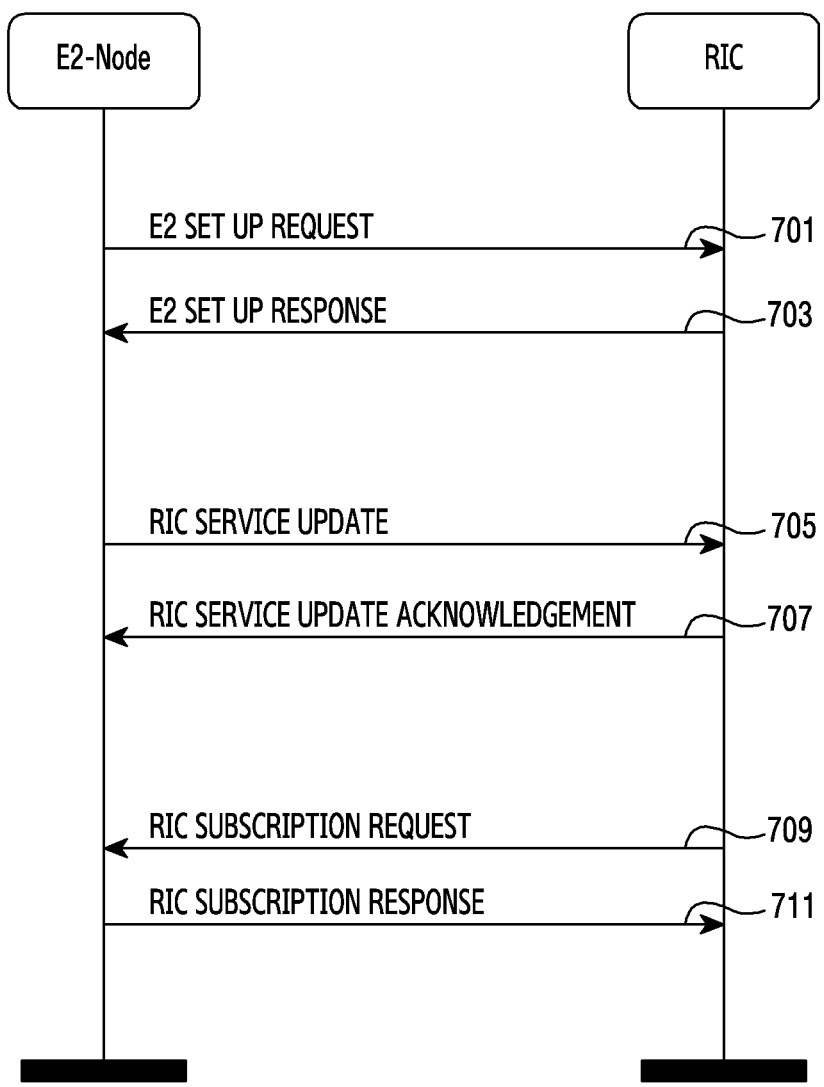
FIG. 7A is a view illustrating an example of a signaling procedure between an E2 node and a radio access network (RAN) intelligence controller (RIC) according to an embodiment of the disclosure.

FIG. 7A illustrates an example of a signaling procedure between an E2 node and a radio access network (RAN) intelligent controller (RIC) according to an embodiment of the disclosure.

Specifically, FIG. 7A illustrates a setup procedure of an E2 I/F between the E2 node and the RIC, a subscription procedure between the E2 node and the RIC, a procedure for providing information. FIG. 7A illustrates an initial SET UP procedure until a time at which the RIC, which is being discussed in O-RAN standards, is able to provide a service. FIG. 7A illustrates a Setup procedure of the E2 I/F between the E2 node and the RIC, an E2 SERVICE UPDATE procedure, and an RIC subscription message transmission procedure. The E2 node 610 is illustrated as the E2 node and the RIC 640 is illustrated as the RIC.

Referring to FIG. 7A, at operation 701, the E2 node may transmit an E2 setup request message to the RIC. An E2 NODE FUNCTION function positioned in the E2 node may find the RIC by using an RIC IP Address set by operations, administration and management (OAM), and may transmit the E2 SET UP REQUEST message.

At operation 703, the RIC may transmit an E2 setup response message to the E2 node. The RIC may transmit the E2 SETUP RESPONSE message when the RIC is able to receive the E2 SETUP REQUEST message transmitted by the E2 NODE.

At operation 705, the E2 node may transmit an RIC service update message to the RIC. The E2 node may write an E2 NODE supportable function capability with an E2 FUNCTION ID. The E2 node may write a list on an RIC SERVICE UPDATE ID. The E2 node may carry a result of writing on E2 SERVICE UPDATE and may transmit the same to the RIC.

At operation 707, the RIC may transmit an RIC service update acknowledgement message to the E2 node. The RIC may transmit the E2 SERVICE UPDATE ACKNOWLEDGEMENT message when the RIC is able to receive E2 NODE FUNCTION ID values of the E2 SERVICE UPDATE message transmitted by the E2 NODE.

At operation 709, the RIC may transmit a service subscription request message to the E2 node. A specific xApp positioned in the RIC may request an RIC E2 termination function to subscribe to a specific E2 NODE FUNCTION supported in the E2.

At operation 711, the E2 node may transmit a service subscription response message to the RIC. The E2 node function may decode the SUBSCRIPTION REQUEST message. The E2 node function may successfully set an event condition that is requested from the E2 node function by the RIC, and then, may transmit, to the RIC, a message indicating that an event trigger condition is successfully set as a SUBSCRIPTION RESPONSE.

Figure 7B:
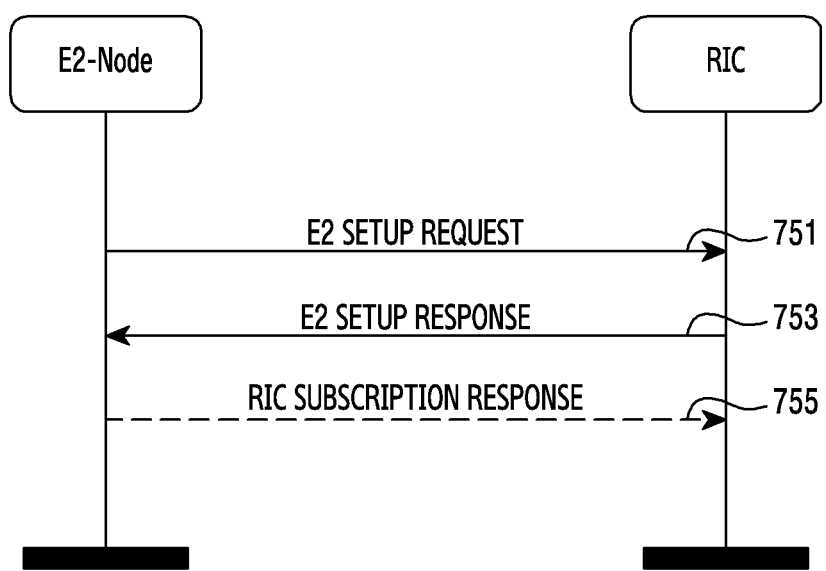
FIG. 7B is a view illustrating an example of a subscription procedure between an E2 node and an RIC according to an embodiment of the disclosure.

FIG. 7B illustrates an example of a subscription procedure between an E2 node and an RIC according to an embodiment of the disclosure.

In addition, FIG. 7B illustrates an example of an E2 SETUP procedure suggested in the disclosure. The E2 node 610 is illustrated as the E2 node and the RIC 640 is illustrated as the RIC.

Referring to FIG. 7B, at operation 751, the E2 node may transmit an E2 setup request message to the RIC. The E2 node may find the RIC by using an RIC IP Address set by OAM in order to make an E2 CONNECTION with the RIC, and may transmit an E2 SET UP REQUEST message. According to an embodiment, the E2 node may additionally transmit an RIC SERVICE UPDATE Information Element, which is being discussed in existing standards, when transmitting the E2 SET UP REQUEST message. That is, the E2 node may include the RIC SERVICE UPDATE IE in the E2 setup request message. Details of the RIC service update IE are illustrated in FIG. 8A.

At operation 753, the RIC may transmit an E2 setup response message to the E2 node. An RIC E2 termination function may set an E2 connection when the E2 SETUP REQUEST message is a valid message, and may generate an E2 SETUP RESPONSE message and may transmit the same to the 2D node. According to an embodiment, the E2 SETUP RESPONSE message may selectively carry and transmit an RIC SUBSCRIPTION REQUEST message Information Element. Details of the RIC SUBSCRIPTION REQUEST Information Element are illustrated in FIG. 8B. Upon receiving the E2 SETUP RESPONSE message, the E2 node may set up an E2 connection. When the RIC SUBSCRIPTION REQUEST message Information Element is carried on the E2 SETUP RESPONSE message and is transmitted, an E2 Node Function may decode the message and may perform an RIC subscription procedure.

At operation 755, the E2 node may transmit an RIC subscription response message to the RIC. The E2 node may successfully set up an event condition defined by the RIC subscription, and then, may transmit a subscription response to the RIC. In this case, information indicating that an event trigger condition is successfully set up may be transmitted to the RIC through the subscription response.

In addition to the above-described contents, some contents explained in FIG. 8A may be applied to FIG. 8B in the same or similar way.

FIG. 8A illustrates Information Elements (IEs) of the E2 RIC SERVICE UPDATE according to an embodiment of the disclosure.

The first IE may indicate a Message Type and may have a unique value according to an E2 message. Details of the Message Type are illustrated in FIG. 9. The second IE indicates an RIC REQUEST ID and designates a specific xApp. Details of the message are illustrated in FIG. 10. The third IE indicates an E2 NODE FUNCTION ID. The E2 NODE FUNCTION ID may have a range value divided by E2 NODE, and may designate a specific E2 NODE FUNCTION for a specific E2 NODE. Details of the message are illustrated in FIG. 11.

The fourth IE indicates a SERVICES TO ADD list. The SERVICES TO ADD list is a list of call processing functions supported by the E2 node. Each call processing function may include an E2 NODE FUNCTION ID value and an E2 NODE FUNCTION NAME. The E2 NODE FUNCTION ID value and the E2 NODE FUNCTION NAME may be set by OAM. For example, an X2 HANDOVER function has an E2 NODE FUNCTION ID value of 21, and E2 NODE FUNCTION NAME: X2 HANDOVER. The SERVICES TO ADD list may be set up to 4096 at most.

The fifth IE indicates a SERVICES TO DELETE list. The SERVICES TO DELETE is a list of call processing functions which are already supported by the E2 NODE, but are changed to non-supportable functions due to a change in the environment. The SERVICES TO DELETE list may be set up to 4096 at most. Like the SERVICES TO ADD list, each call processing function of the SERVICES TO DELETE list may include an E2 NODE FUNCTION ID value and an E2 NODE FUNCTION NAME.

FIG. 8B illustrates Information Elements (IEs) of the E2 subscription request message according to an embodiment of the disclosure.

The first IE indicates a Message Type and has a unique value according to an E2 message. Details of the Message Type are illustrated in FIG. 9. The second IE indicates an RIC REQUEST ID and designates a specific xApp. Details of the message are illustrated in FIG. 10. The third IE indicates an E2 NODE FUNCTION ID. The E2 NODE FUNCTION ID may have a range value divided by E2 NODE, and may designate a specific E2 NODE FUNCTION for a specific E2 NODE. Details of the message are illustrated in FIG. 10. The fourth IE indicates an RIC SUBSCRIPTION TYPE, and may add various types to the E2 NODE, so that an event trigger condition is set up.

FIG. 9 shows details of the Message Type IE according to an embodiment of the disclosure.

The Procedure Code value, which is the first IE, is an integer ranging from 0 to 255, and a specific MESSAGE TYPE (PROCEDURE CODE) is set up. For example, message values 0 to 255, that is, 256 message values in total may be set up, for example, by setting the Procedure code value 0 to Subscription, setting the Procedure code value 1 to E2 SETUP, setting the Procedure code value 2 to Indication Request message value. For example, the message values may be defined in an O-RAN as shown in Table 1 presented below:

TABLE 1

| | |
|---|---|
| id-e2Subscription | ProcedureCode ::= 0 |
| id-e2Setup | ProcedureCode ::= 1 |
| id-e2Indication | ProcedureCode ::= 2 |
| id-e2Control | ProcedureCode ::= 3 |
| id-e2Serviceupdate | ProcedureCode ::= 4 |
| id-e2Servicequery | ProcedureCode ::= 5 |

The Type of message which is the second IE of the Message Type IE indicates a type of a message and may define Initiating, Successful, Unsuccessful messages.

FIG. 10 shows the RIC REQUEST ID value according to an embodiment of the disclosure. The RIC REQUEST ID value is an integer ranging from 0 to 65535, and a unique value may be set up for a specific xApp.

FIG. 11 shows the E2 NODE FUNCTION ID value according to an embodiment of the disclosure. The E2 NODE FUNCTION ID value is an integer ranging from 0 to 4095, and may be set by dividing a range value of each E2 node.

TABLE 2

| |
|---|
| O-CU-CP (1~512) |
| O-CU-UP (513~1024) |
| O-DU (1025~1536) |
| O-RAN eNB (1537~2048) |

Values after 2048 are Reserved values and may be set when an additional E2 node is added.

According to the above-described embodiments, a subscription procedure of a service for operations of the RIC may be performed in combination with an E2 setup procedure. That is, an E2 SETUP RESPONSE message may selectively include an RIC SUBSCRIPTION REQUEST message Information Element (IE). In addition, according to an embodiment, the subscription procedure for the service for operations of the RIC may be performed in combination with an update procedure of the service related to the RIC. In this case, an RIC SERVICE UPDATE ACKNOWLEDGEMENT message may selectively include an RIC SUBSCRIPTION REQUEST message Information Element (IE).

Methods based on the claims or the embodiments disclosed in the disclosure may be implemented in hardware, software, or a combination of both.

When implemented in software, a computer readable storage medium for storing one or more programs (software modules) may be provided. The one or more programs stored in the computer readable storage medium are configured for execution performed by one or more processors in an electronic device. The one or more programs include instructions for allowing the electronic device to execute the methods based on the claims or the embodiments disclosed in the disclosure.

The program (the software module or software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a local area network (LAN), a wide LAN (WLAN), or a storage area network (SAN) or a communication network configured by combining the networks. The storage device may access via an external port to a device which performs the embodiments of the disclosure. In addition, an additional storage device on a communication network may access to a device which performs the embodiments of the disclosure.

In the above-described specific embodiments of the disclosure, elements included in the disclosure are expressed in singular or plural forms according to specific embodiments. However, singular or plural forms are appropriately selected according to suggested situations for convenience of explanation, and the disclosure is not limited to a single element or plural elements. An element which is expressed in a plural form may be configured in a singular form or an element which is expressed in a singular form may be configured in plural number.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by an E2 node, the method comprising:
   transmitting an E2 setup request message to a radio access network (RAN) intelligent controller (RIC); and
   receiving an E2 setup response message from the RIC,
   wherein the E2 setup request message comprises an information element (IE) related to a service update request message of the RIC.

2. The method of claim 1,
   wherein the IE related to the service update request message of the RIC comprises a list of one or more E2 node functions to be added, and
   wherein the list comprises an identifier (ID) regarding each of the one or more E2 node functions.

3. The method of claim 2,
   wherein the E2 setup request message comprises information regarding a message type, and
   wherein the message type indicates a procedure code and a message type.

4. The method of claim 1,
   wherein the RIC is a near real time (RT) RIC, and
   wherein the E2 node comprises an open radio access network (O-RAN) distributed unit (O-DU), an O-RAN central unit-control plane (O-CU-CP), an O-RAN central unit-user plane (O-CU-UP), or an O-RAN eNodeB (O-eNB).

5. The method of claim 1,
   wherein the E2 setup response message comprises an IE related to an RIC subscription request message, and
   wherein the method further comprises transmitting an RIC subscription response message to the RIC in response to the E2 setup response message.

6. A method performed by a radio access network (RAN) intelligent controller (RIC), the method comprising:
   receiving an E2 setup request message from an E2 node; and
   transmitting an E2 setup response message to the E2 node,
   wherein the E2 setup request message comprises an information element (IE) related to a service update request message of the RIC.

7. The method of claim 6,
   wherein the IE related to the service update request message of the RIC comprises a list of one or more E2 node functions to be added, and
   wherein the list comprises an identifier (ID) regarding each of the one or more E2 node functions.

8. The method of claim 7,
   wherein the E2 setup request message comprises information regarding a message type, and
   wherein the message type indicates a procedure code and a message type.

9. The method of claim 6,
   wherein the RIC is a near real time (RT) RIC, and
   wherein the E2 node comprises an open radio access network (O-RAN) distributed unit (O-DU), an O-RAN central unit-control plane (O-CU-CP), an O-RAN central unit-user plane (O-CU-UP), or an O-RAN eNodeB (O-eNB).

10. The method of claim 6,
    wherein the E2 setup response message comprises an IE related to an RIC subscription request message, and
    wherein the method further comprises receiving an RIC subscription response message from the E2 node in response to the E2 setup response message.

11. An apparatus functioning as an E2 node, the apparatus comprising:
    at least one transceiver; and
    at least one processor coupled with the at least one transceiver,
    wherein the at least one processor is configured to perform:
    transmit an E2 setup request message to a radio access network (RAN) intelligent controller (RIC), and
    receive an E2 setup response message from the RIC,
    wherein the E2 setup request message comprises an information element (IE) related to a service update request message of the RIC.

12. The apparatus of claim 11,
    wherein the IE related to the service update request message of the RIC comprises a list of one or more E2 node functions to be added, and
    wherein the list comprises an identifier (ID) regarding each of the one or more E2 node functions.

13. The apparatus of claim 12,
    wherein the E2 setup request message comprises information regarding a message type, and
    wherein the message type indicates a procedure code and a message type.

14. The apparatus of claim 11,
    wherein the RIC is a near real time (RT) RIC, and
    wherein the E2 node comprises an open radio access network (O-RAN) distributed unit (O-DU), an O-RAN central unit-control plane (O-CU-CP), an O-RAN central unit-user plane (O-CU-UP), or an O-RAN eNodeB (O-eNB).

15. The apparatus of claim 11,
    wherein the E2 setup response message comprises an IE related to an RIC subscription request message, and
    wherein the at least one processor is further configured to transmit an RIC subscription response message to the RIC in response to the E2 setup response message.

16. An apparatus functioning as a radio access network (RAN) intelligent controller (RIC), the apparatus comprising:
    at least one transceiver; and
    at least one processor coupled with the at least one transceiver,
    wherein the at least one processor is configured to:
    receive an E2 setup request message from an E2 node; and
    transmit an E2 setup response message to the E2 node,
    wherein the E2 setup request message comprises an information element (IE) related to a service update request message of the RIC.

17. The apparatus of claim 16,
wherein the IE related to the service update request message of the RIC comprises a list of one or more E2 node functions to be added, and
wherein the list comprises an identifier (ID) regarding each of the one or more E2 node functions.

18. The apparatus of claim 17,
wherein the E2 setup request message comprises information regarding a message type, and
wherein the message type indicates a procedure code and a message type.

19. The apparatus of claim 16,
wherein the RIC is a near real time (RT) RIC, and
wherein the E2 node comprises an open radio access network (O-RAN) distributed unit (O-DU), an O-RAN central unit-control plane (O-CU-CP), an O-RAN central unit-user plane (O-CU-UP), or an O-RAN eNodeB (O-eNB).

20. The apparatus of claim 16,
wherein the E2 setup response message comprises an IE related to an RIC subscription request message, and
wherein the at least one processor is further configured receive an RIC subscription response message from the E2 node in response to the E2 setup response message.

* * * * *